US012777020B2

(12) United States Patent
Bakshi et al.

(10) Patent No.: US 12,777,020 B2
(45) Date of Patent: Oct. 27, 2026

(54) METHOD FOR RESOURCE TRANSFER MODE EVALUATION IN DISTRIBUTED NETWORK USING SEMI-DYNAMIC TOKENIZED GRAPH NODE PROCESSING

(71) Applicant: BANK OF AMERICA CORPORATION, Charlotte, NC (US)

(72) Inventors: Sakshi Bakshi, New Delhi (IN); Amod Jha, Hyderabad (IN); Anup Kumar Kedia, Gachibowli (IN); Siva Kumar Paini, Hyderabad (IN); Sachin Juneja, Nagar (IN); Amit Agarwal, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 844 days.

(21) Appl. No.: 18/119,958

(22) Filed: Mar. 10, 2023

(65) Prior Publication Data

US 2024/0305609 A1 Sep. 12, 2024

(51) Int. Cl.
*H04L 9/40* (2022.01)
*H04L 9/32* (2006.01)

(52) U.S. Cl.
CPC .......... *H04L 63/029* (2013.01); *H04L 9/3213* (2013.01); *H04L 63/10* (2013.01)

(58) Field of Classification Search
CPC ...... H04L 63/029; H04L 63/10; H04L 9/3213
See application file for complete search history.

(56) References Cited

U.S. PATENT DOCUMENTS

| | | | |
|---|---|---|---|
| 7,562,814 B1 | 7/2009 | Shao et al. | |
| 7,686,214 B1 | 3/2010 | Shao et al. | |
| 8,407,145 B1 | 3/2013 | Banaugh et al. | |
| 8,566,235 B2 | 10/2013 | Katz et al. | |
| 8,660,950 B2 | 2/2014 | Mackouse | |
| 9,461,876 B2 | 10/2016 | Van Dusen et al. | |
| 10,043,166 B1 | 8/2018 | Kazenas et al. | |
| 11,200,569 B1 | 12/2021 | James et al. | |
| 11,222,052 B2 | 1/2022 | Hertz et al. | |
| 11,463,366 B1 * | 10/2022 | Burnett ................ | H04B 7/0617 |
| 11,557,174 B2 | 1/2023 | Simons | |
| 11,625,620 B2 | 4/2023 | Singaraju et al. | |

(Continued)

*Primary Examiner* — David R Lazaro
*Assistant Examiner* — Xiang Yu
(74) *Attorney, Agent, or Firm* — Moore & Van Allen PLLC; Nicholas C. Russell

(57) ABSTRACT

Systems, computer program products, and methods are described herein for resource transfer mode evaluation in distributed network using semi-dynamic tokenized graph node processing. The present disclosure is configured to receive resource data from one or more resource transfer channels; extract metadata from the resource data and determine one or more resource transfer processing requests; generate a dynamic hash value for the one or more resource transfer processing requests; tokenize the dynamic hash value to generate a semi-dynamic token; select a resource gateway and a resource mode for the one or more resource transfer processing requests; generate a key value pair for the selected resource gateway and the resource mode; tokenize the key value pair and store the tokenized key value pair on a distributed ledger; and flag one or more non-selected resource gateways and resource nodes.

20 Claims, 8 Drawing Sheets

(56) References Cited

U.S. PATENT DOCUMENTS

| | | | | |
|---|---|---|---|---|
| 2017/0148021 | A1* | 5/2017 | Goldstein | G06Q 20/027 |
| 2017/0221066 | A1 | 8/2017 | Ledford et al. | |
| 2019/0394096 | A1* | 12/2019 | Bernat | G06F 11/30 |
| 2020/0184547 | A1 | 6/2020 | Andon et al. | |
| 2020/0394650 | A1 | 12/2020 | Jackson | |
| 2021/0201336 | A1 | 7/2021 | Mallett et al. | |
| 2021/0279695 | A1 | 9/2021 | Rice | |
| 2021/0382966 | A1 | 12/2021 | Shii et al. | |
| 2022/0040557 | A1 | 2/2022 | Tran | |
| 2022/0222246 | A1 | 7/2022 | Rich et al. | |

* cited by examiner

METHOD FOR RESOURCE TRANSFER MODE EVALUATION IN DISTRIBUTED NETWORK USING SEMI-DYNAMIC TOKENIZED GRAPH NODE PROCESSING

TECHNOLOGICAL FIELD

Example embodiments of the present disclosure relate to methods for resource transfer mode evaluation in distributed network using semi-dynamic tokenized graph node processing.

BACKGROUND

In large enterprises, there are various resource channels for conducting resource transfers. Each resource channel also utilizes a resource gateway, which is typically an enterprise resource planning (ERP) system. Due to the variety of channels and gateways, there are known complexities in ensuring non-duplicate resource transfers or and incorrect invoice resource transfer requests. In some instances, using conventional systems, users may be mistakenly requested to transmit resources twice for the same good or service via two different payment gateways if a merchant erroneously transmits the same resource request twice. Thus, there is a need to ensure that these duplicative resource requests are avoided in order to streamline the data storage and analysis related to resource transfer processes, as well as to provide increased end-user satisfaction.

Applicant has identified a number of deficiencies and problems associated with resource transfer mode evaluation in distributed networks. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for resource transfer mode evaluation in distributed networks using semi-dynamic tokenized graph node processing.

The solution described herein addresses the above needs via the use of a dynamic NFT-based (non-fungible token based) payment mode evaluator which creates dynamic NFT-based resource modes and resource channel metadata. This data and metadata may then be linked and tracked using a series of hashed graph nodes. These dynamic "hashnodes" are tokenized with parameters to dynamically link to a valid key-value pair. This key-value pair is evaluated in an off-chain mode to compare and find appropriate resource processing channel(s) and is then paired in on-chain mode to the relevant tokenized hash graph node.

The dynamic relation link disables the other node relations and marks the graph for verified payment processing via a specific channel. These hash-graph nodes are parameterized and tokenized using cognitive AI (artificial intelligence) engine that also helps in node paring to the key-value. The hash-ledgers are updated to form payment trails and for any duplicate or incorrect payment processing, the subsequent payment gateways and channels are disabled. The system is interactive with the user to overwrite the disabled channel/gateway and ensures only the user verified resource transfers are processed, making the resource transfer processing evaluation, customizable and interactive based on user needs. Additionally, for any resource transfer in multiple parts, the tokenized graphs enable real time tagging and processing.

In one aspect, a system for resource transfer mode evaluation in distributed networks using semi-dynamic tokenized graph node processing is presented, the system generally comprising the steps of: receive resource data from one or more resource transfer channels; extract metadata from the resource data and determine one or more resource transfer processing requests; generate a dynamic hash value for the one or more resource transfer processing requests; tokenize the dynamic hash value to generate a semi-dynamic token; select a resource gateway and a resource mode for the one or more resource transfer processing requests; generate a key value pair for the selected resource gateway and the resource mode; tokenize the key value pair and store the tokenized key value pair on a distributed ledger; and flag one or more non-selected resource gateways and resource nodes.

In some embodiments, the invention is further configured to block one or more nodes associated with the flagged one or more non-selected resource gateways and resources nodes.

In some embodiments, the invention is further configured to transmit a notification to one or more user devices containing an override option for the block of the one or more nodes associated with the flagged one or more non-selected resource gateways and resources nodes.

In some embodiments, the invention is further configured to update metadata of the semi-dynamic token in response to receiving an affirmative response to the override option.

In some embodiments, the invention is further configured to disable all subsequent resource modes or resource gateways for the one or more resource transfer processing requests.

In some embodiments, selecting the resource gateway and the resource mode for the one or more resource transfer processing requests further comprises the use of a machine learning model to analyze the extracted metadata from the resource data to determine a resource transfer type.

In some embodiments, the invention is further configured to provide an option via a graphical user interface for a user to select the resource gateway and the resource mode.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
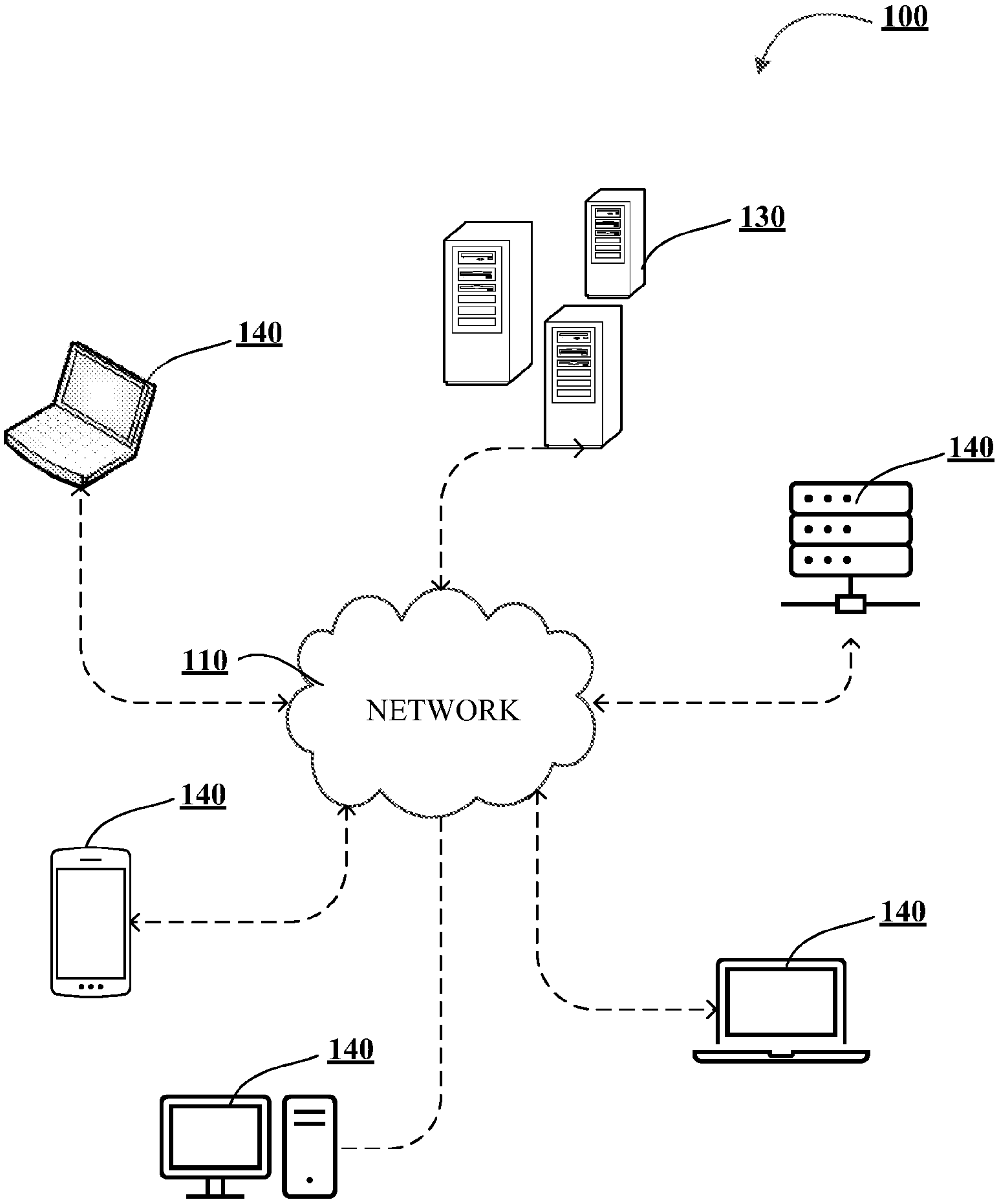
Figure 1B:
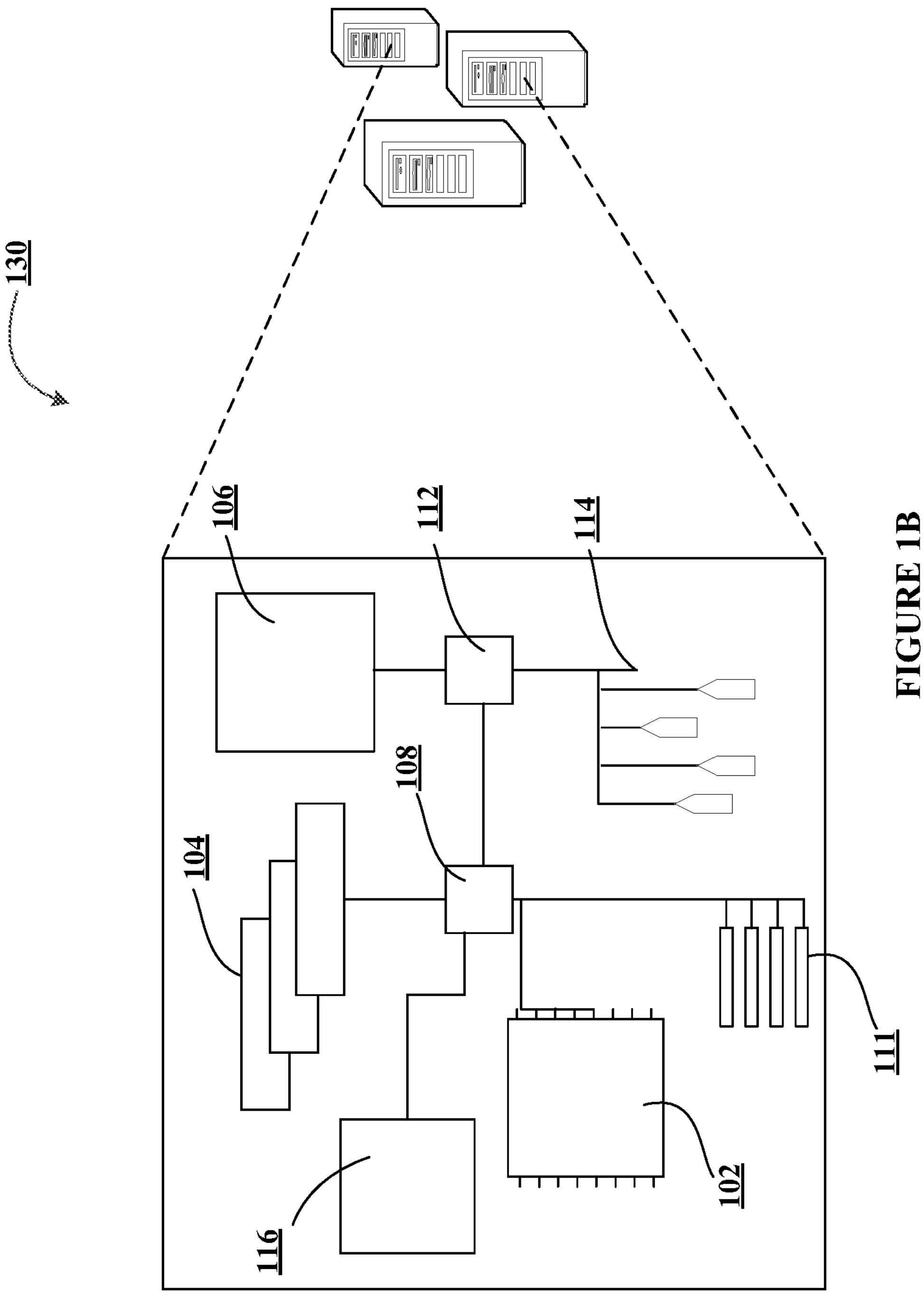
Figure 1C:
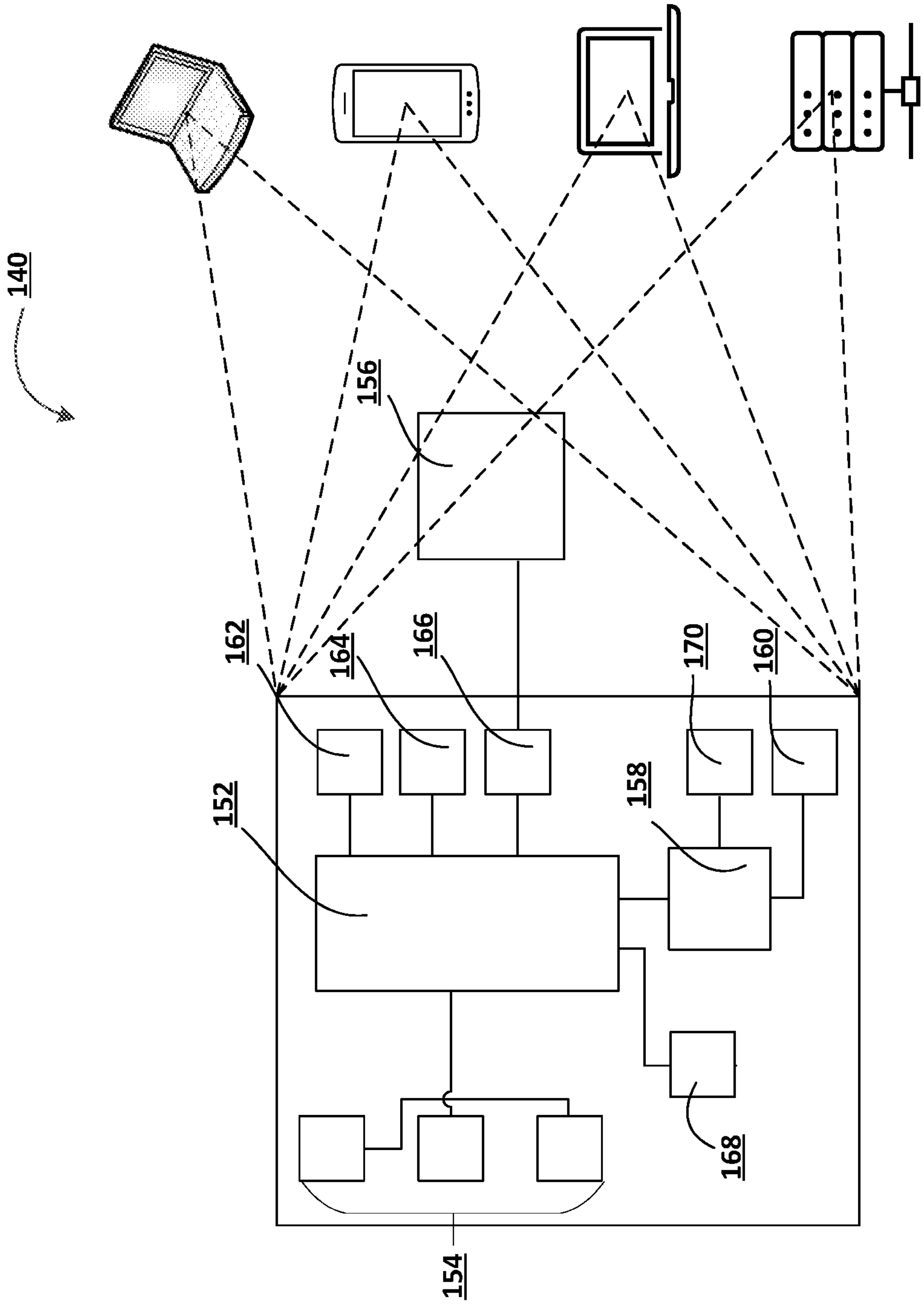

FIGS. 1A-1C illustrate technical components of an exemplary distributed computing environment for resource transfer mode evaluation in distributed network using semi-dynamic tokenized graph node processing, in accordance with an embodiment of the disclosure.

Figure 2:
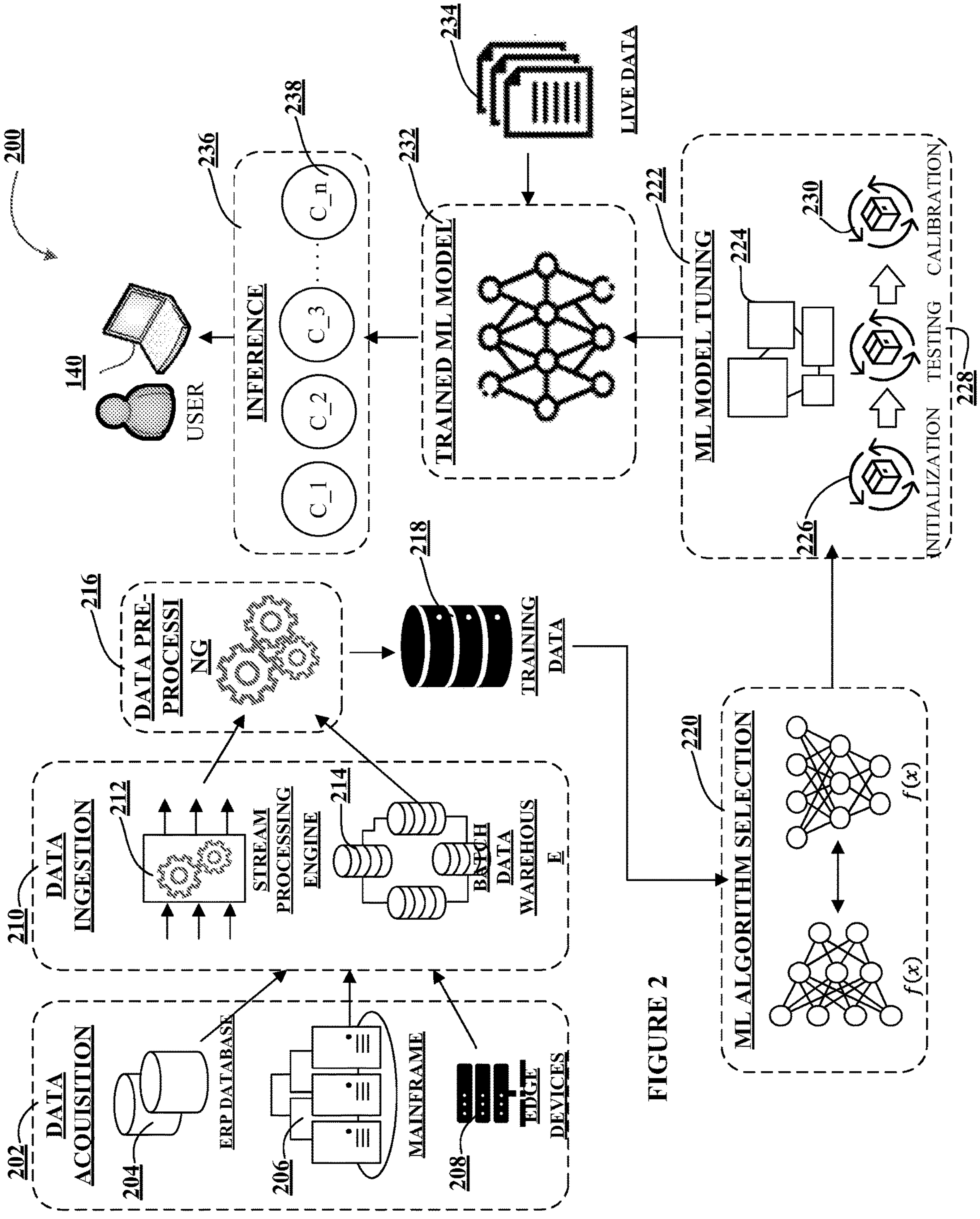

FIG. 2 illustrates an exemplary machine learning (ML) subsystem architecture 200, in accordance with an embodiment of the disclosure.

Figure 3A:
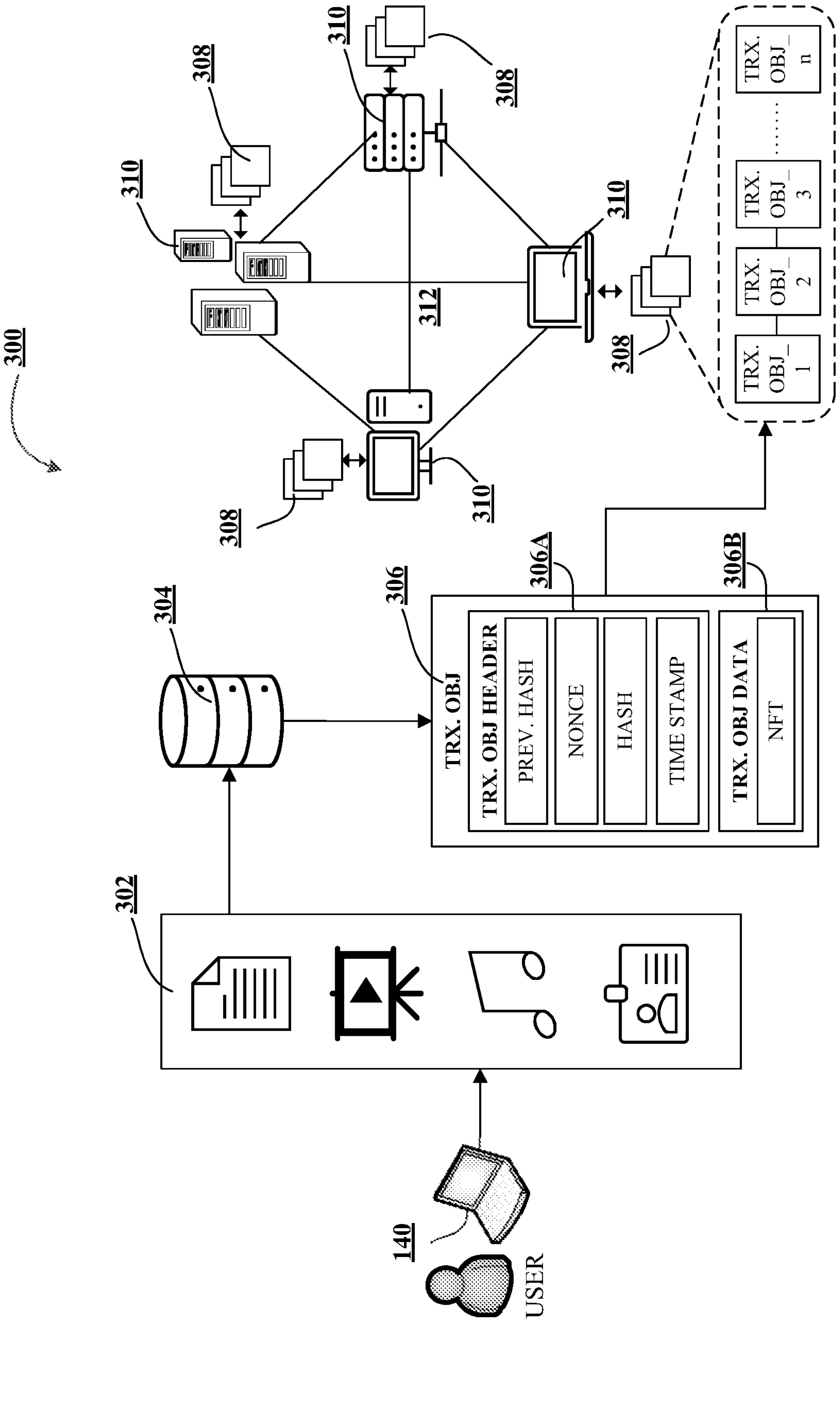
Figure 3B:
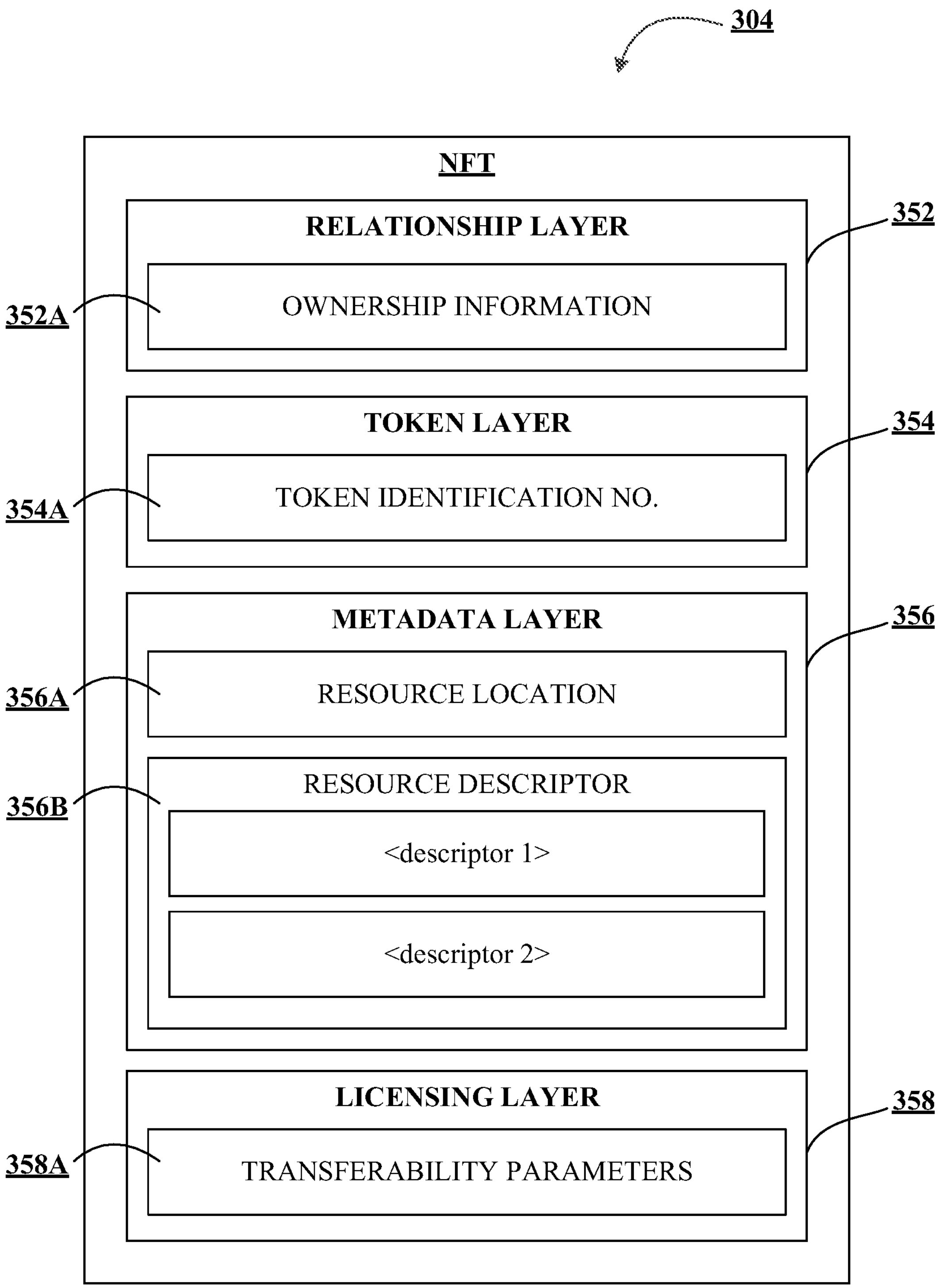

FIGS. 3A-3B illustrate an exemplary process of creating an NFT 300, in accordance with an embodiment of the invention.

Figure 4:
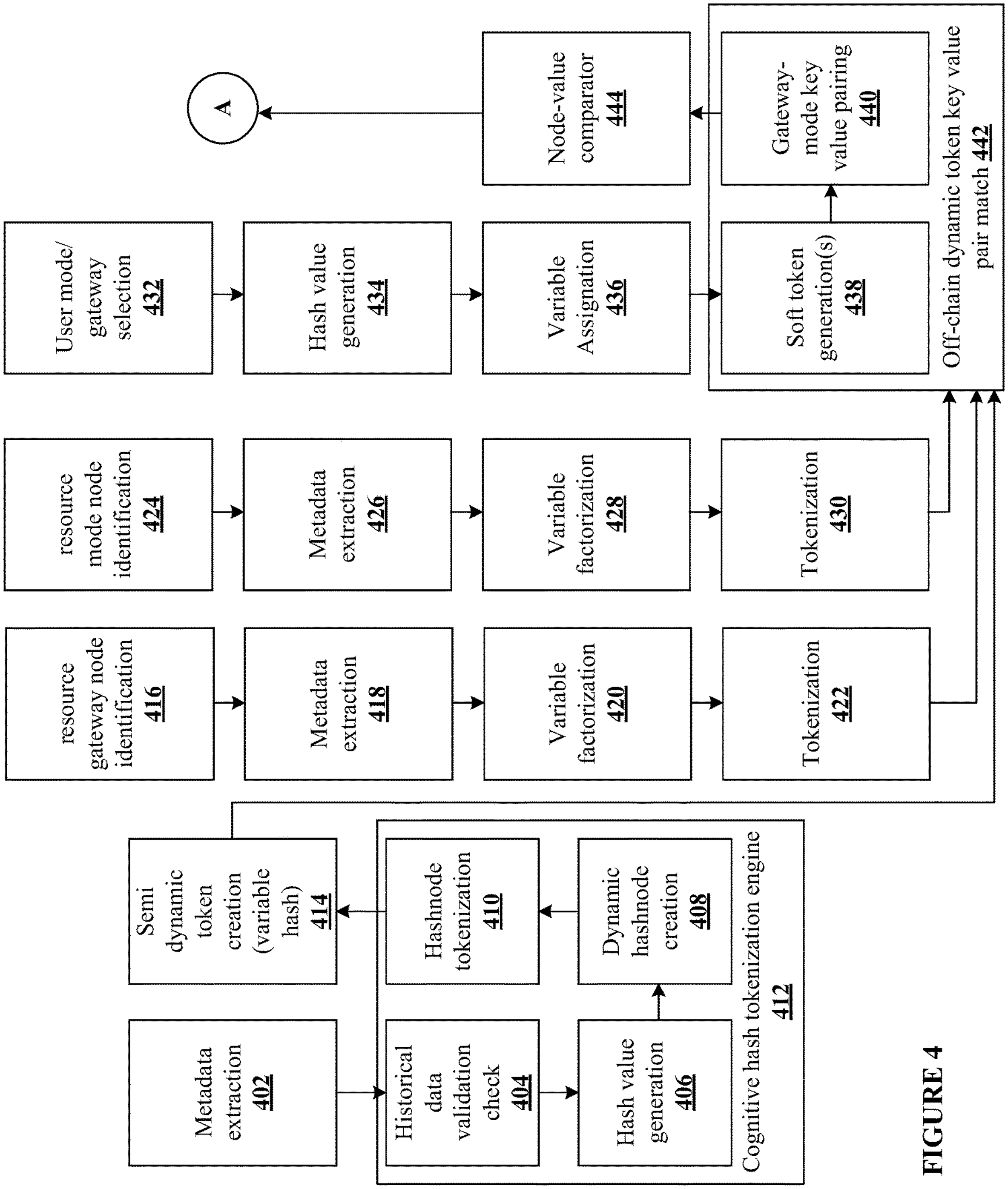

FIG. 4 illustrates a first high-level process flow for resource transfer mode evaluation in distributed network using semi-dynamic tokenized graph node processing, in accordance with an embodiment of the disclosure.

Figure 5:
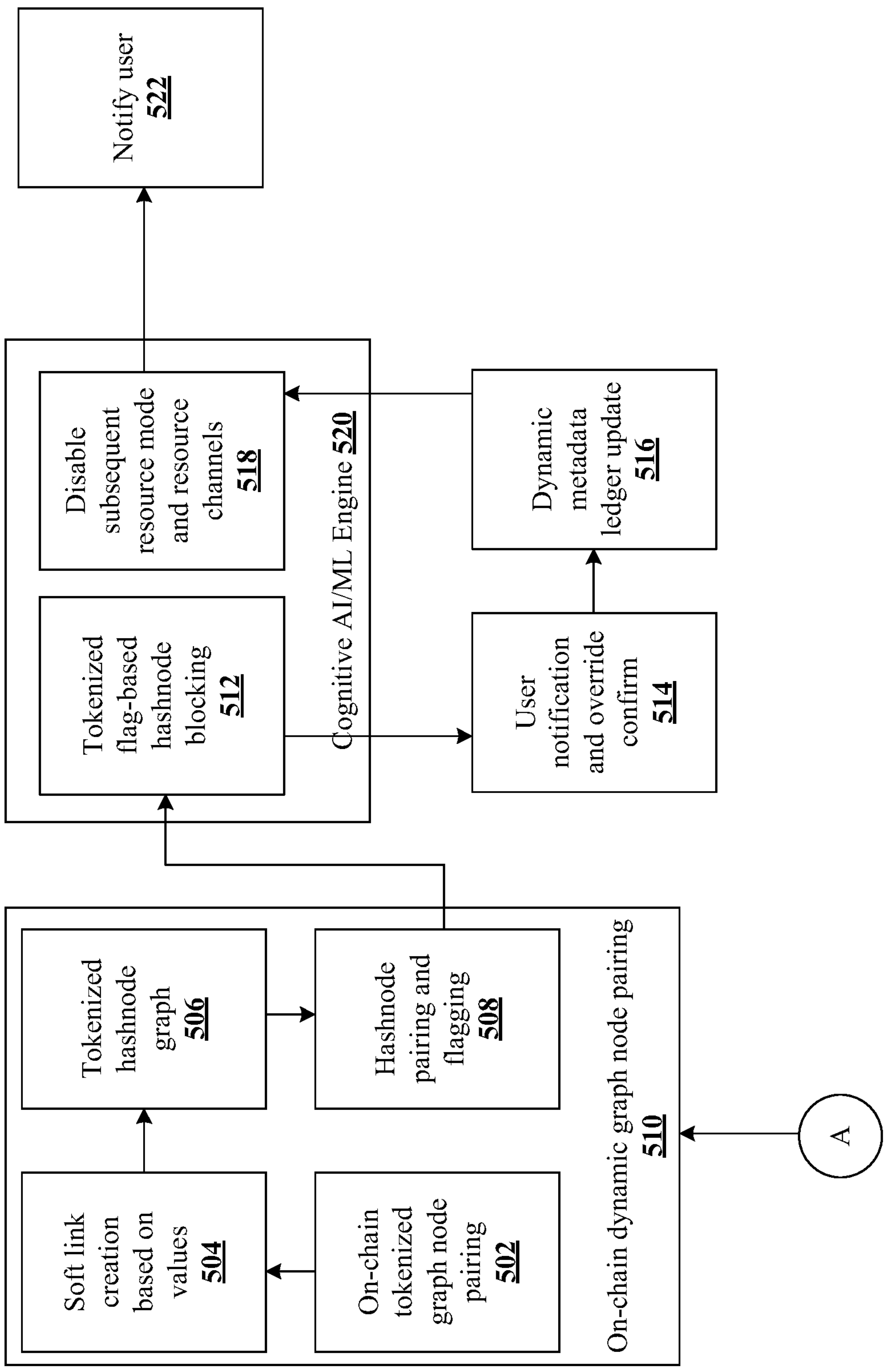

FIG. 5 illustrates a second high-level process flow for resource transfer mode evaluation in distributed network using semi-dynamic tokenized graph node processing, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As used herein, an "NFT" (non-fungible token) is a cryptographic record (referred to as "tokens") linked to a resource. An NFT is typically stored on a distributed ledger that certifies ownership and authenticity of the resource, and exchangeable in a peer-to-peer network.

The dynamic NFT based tokenized graph node method of resource transfer mode evaluation works on the principle of creating semi-dynamic NFTs with resource transfer modes and resource transfer gateway tokens pre-defined with a variable metadata hash that is dynamic in nature. This dynamic hash value is updated based on user input, wherein the user may choose a specific gateway or mode. This semi-dynamic NFT token forms a key-value pair based on the variable hash values, and effectively blocks all the other resource gateway or resource channel nodes through dynamic tokenized hash-graphs forming a dynamic link pair. This dual key-value pairing enables the node locking, and hence prevents dual or incorrect resource transfers.

The NFT based Payment channels and payment gateway nodes are semi-dynamic in nature with (1) the gateway or channel metadata static, and (2) additional dynamic hash variable incorporated, which is dynamic in nature based on user inputs, hence "semi-dynamic." The hash-graph nodes are also tokenized to make the key-value pairing more streamlined and capable of real-time information sharing, further avoiding crossed or duplicative resource channels. The dual soft-token key-value pairing is a two-way process, with first level of key-value formed with semi-dynamic NFT based resource gateways and resource channels, and the second pairing between the first value pair with tokenized graph node. The token pairing between resource gateways and resource channels happen in off-chain mode, and the value of hash-node pairing happens in on-chain mode, making the entire flow end-to-end dynamic in nature. Tokenization for hashnodes is assisted by a smart AI engine which also processes the dynamic variable for the semi-dynamic NFT channel and gateway tokens. As such, the tokenized hashnode can help in tracking resource trail with dynamic relation links and nodes added for partial resource transfers/corrected resource transfers, etc. Once the final pairing is done, all the subsequent payment nodes are blocked to prevent any duplicate or incorrect payments. The overall system is a user interactive system with user inputs that can override any blocked hashnodes. It is also noted that the dynamic variables work in first-in-first-out (FIFO) mode with the first chosen gateway and channel having identical variable linking. For any more than one node being chosen by the user, the user gets notification to approve diversifying the hash-graph flow, which aids in tracing milestone-based partial resource transfer processing and avoids any incorrect invoice payment scenarios.

FIGS. 1A-1C illustrate technical components of an exemplary distributed computing environment 100 for resource transfer mode evaluation in distributed networks using semi-dynamic tokenized graph node processing, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) or AI subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3A illustrates an exemplary process of creating an NFT 300, in accordance with an embodiment of the invention. As shown in FIG. 3A, to create or "mint" an NFT, a user (e.g., NFT owner) may identify, using a user input device 140, resources 302 that the user wishes to mint as an NFT. Typically, NFTs are minted from digital objects that represent both tangible and intangible objects. These resources 302 may include a piece of art, music, collectible, virtual world items, videos, real-world items such as artwork and real estate, or any other presumed valuable object. These resources 302 are then digitized into a proper format to produce an NFT 304. The NFT 304 may be a multi-layered documentation that identifies the resources 302 but also evidences various transaction conditions associated therewith, as described in more detail with respect to FIG. 3A.

To record the NFT in a distributed ledger, a transaction object 306 for the NFT 304 is created. The transaction object 306 may include a transaction header 306A and a transaction object data 306B. The transaction header 306A may include a cryptographic hash of the previous transaction object, a nonce—a randomly generated 32-bit whole number when the transaction object is created, cryptographic hash of the current transaction object wedded to the nonce, and a time stamp. The transaction object data 306B may include the NFT 304 being recorded. Once the transaction object 306 is generated, the NFT 204 is considered signed and forever tied to its nonce and hash. The transaction object 306 is then deployed in the distributed ledger 308. At this time, a distributed ledger address is generated for the transaction object 306, i.e., an indication of where it is located on the distributed ledger 308 and captured for recording purposes. Once deployed, the NFT 304 is linked permanently to its hash and the distributed ledger 308, and is considered recorded in the distributed ledger 308, thus concluding the minting process As shown in FIG. 3A, the distributed ledger 308 may be maintained on multiple devices (nodes) 310 that are authorized to keep track of the distributed ledger 308. For example, these nodes 310 may be computing devices such as system 130 and end-point device(s) 140. One node 310 may have a complete or partial copy of the entire distributed ledger 308 or set of transactions and/or transaction objects on the distributed ledger 308. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 3B illustrates an exemplary NFT 304 as a multi-layered documentation of a resource, in accordance with an embodiment of an invention. As shown in FIG. 3B, the NFT may include at least relationship layer 352, a token layer 354, a metadata layer 356, and a licensing layer 358. The relationship layer 352 may include ownership information 352A, including a map of various users that are associated with the resource and/or the NFT 304, and their relationship to one another. For example, if the NFT 304 is purchased by buyer B1 from a seller S1, the relationship between B1 and S1 as a buyer-seller is recorded in the relationship layer 352. In another example, if the NFT 304 is owned by O1 and the resource itself is stored in a storage facility by storage provider SP1, then the relationship between O1 and SP1 as owner-file storage provider is recorded in the relationship layer 352. The token layer 354 may include a token identification number 354A that is used to identify the NFT 304. The metadata layer 356 may include at least a file location 356A and a file descriptor 356B. The file location 356A may provide information associated with the specific location of the resource 302. Depending on the conditions listed in the smart contract underlying the distributed ledger 308, the resource 302 may be stored on-chain, i.e., directly on the distributed ledger 308 along with the NFT 304, or off-chain, i.e., in an external storage location. The file location 356A identifies where the resource 302 is stored. The file descriptor 356B may include specific information associated with the source itself 302. For example, the file descriptor 356B may include information about the supply, authenticity, lineage, provenance of the resource 302. The licensing layer 358 may include any transferability parameters 358B associated with the NFT 304, such as restrictions and licensing rules associated with purchase, sale, and any other types of transfer of the resource 302 and/or the NFT 304 from one person to another. Those skilled in the art will appreciate that various additional layers and combinations of layers can be configured as needed without departing from the scope and spirit of the invention.

FIG. 4 illustrates a first high-level process flow for resource transfer mode evaluation in distributed network using semi-dynamic tokenized graph node processing, in accordance with an embodiment of the disclosure. The dynamic NFT based tokenized graph node method of resource transfer mode evaluation works on the principle of creating semi-dynamic NFTs with resource transfer modes and resource transfer gateway tokens pre-defined with a variable metadata hash that is dynamic in nature. This dynamic hash value is updated based on user input, wherein the user may choose a specific gateway or mode. This semi-dynamic NFT token forms a key-value pair based on the variable hash values, and effectively blocks all the other resource gateway or resource channel nodes through dynamic tokenized hash-graphs forming a dynamic link pair. This dual key-value pairing enables the node locking, and hence prevents dual or incorrect resource transfers.

The NFT based Payment channels and payment gateway nodes are semi-dynamic in nature with (1) the gateway or channel metadata static, and (2) additional dynamic hash variable incorporated, which is dynamic in nature based on user inputs, hence “semi-dynamic.” The hash-graph nodes (“hashnodes”) are also tokenized to make the key-value pairing more streamlined and capable of real-time information sharing, further avoiding crossed or duplicative resource channels. The dual soft-token key-value pairing is a two-way process, with first level of key-value formed with semi-dynamic NFT based resource gateways and resource channels, and the second pairing between the first value pair with tokenized graph node. The token pairing between resource gateways and resource channels happen in off-chain mode, and the value of hash-node pairing happens in on-chain mode, making the entire flow end-to-end dynamic in nature. Tokenization for hashnodes is assisted by a smart AI engine which also processes the dynamic variable for the semi-dynamic NFT channel and gateway tokens. As such, the tokenized hashnode can help in tracking resource trail with dynamic relation links and nodes added for partial resource transfers/corrected resource transfers, etc. Once the final pairing is done, all the subsequent payment nodes are blocked to prevent any duplicate or incorrect payments. The overall system is a user interactive system with user inputs that can override any blocked hashnodes. It is also noted that the dynamic variables work in first-in-first-out (FIFO) mode with the first chosen gateway and channel having identical variable linking. For any more than one node being chosen by the user, the user gets notification to approve diversifying the hash-graph flow, which aids in tracing milestone-based partial resource transfer processing and avoids any incorrect invoice payment scenarios.

As shown in block 402, the process of FIG. 4 begins whereby the system performs a metadata extraction on received resource data. In this step, the system may extract resource transfer details, such as invoice amounts, payment purposes, merchant identifications, user resource account identifications, user preferences in terms of resource mode (resource transfer channel such as ACH, P2P, debit, credit, RTP, or the like), or gateway, or the like. Next, the system may perform a historical data validation check, as shown in block 404. In this way, the system may verify any historical preferences that one or more users of the system, users of the resource transfer, or one or more entities have preferred or initiated in the past. Next, the system performs a hash value generation based on the extracted metadata, as indicated in block 406. In this way, the system creates a dynamic hash-graph node (“hashnode”), as shown in block 408. The hashnode is then tokenized, as indicated in block 410. As indicated in block 412, it is understood that steps 404-410 may be performed using a specific engine or component of the system know as the cognitive hash tokenization engine, which may exists as a part of, or otherwise utilize, one or more trained ML modes 232, as described with regard to FIG. 2, in order to intelligently create dynamic hashnodes and tokenize the hashnodes according to the correct preferences or system programming policies. For instance, the metadata of a resource transfer may indicate that one or more resource modes or gateways are preferred, one or more modes or gateways were previously unsuccessful during a similar transaction, or the like, and may create a hashnode and tokenization that indicates a resource mode or gateway which will be appropriate to complete an underlying resource transfer request contained in the resource data and extracted during the metadata extraction step.

Next, as shown in blocks 416 and 424, the system may identify a resource gateway node and a resource mode node, respectively. Once identified, each of these nodes undergoes metadata extraction, as indicated in blocks 418 and 426, variable factorization, as indicated in blocks 420 and 428, and tokenization, as indicated in blocks 422 and 430. The resulting data is then fed to an off-chain dynamic token key-value pair match process 442, wherein soft-tokens are generated, as indicated by block 438, and gateway-mode key-value pairing also takes places, as indicated in block 440. At this stage, a user mode/gateway selection 432 may be entered by a user via a graphical user interface of a user device. If the user initiates this process, a hash value generation 434 occurs, followed by a variable assignation 436. Once the off-chain dynamic token key value pair match has been completed, the process continues wherein the system activates a node-value comparator 444 to proceed to the next part of the process, as indicated in FIG. 5.

FIG. 5 illustrates a second high-level process flow for resource transfer mode evaluation in distributed network using semi-dynamic tokenized graph node processing, in accordance with an embodiment of the disclosure. As shown by process flow point "A" the process continues where the process flow of FIG. 4 left off, which is the activation of a node-value comparator 444. Once soft links are formed, they act as flags to mark the relevant nodes and, an AI/ML engine thus disables the other nodes (however, this can be overwritten based on user confirmation). Hence, the links/relations are soft-links. The soft-links are forwarded to an on-chain dynamic graph node pairing step, 510.

As indicated in block 510, the on-chain tokenized graph node pairing 502 takes place, followed by a soft-link creation based on these values, as shown in block 504. The system then creates a tokenized hashnode, as shown in block 506, following by a pairing and flagging of the hashnode, as shown in block 508. The cognitive AI/ML engine 520 is then responsible for blocking flagged hashnodes based on the hashnode pairing and flagging step, as indicated by block 512. At this stage, a user can again override or confirm this action in response to an issued notification, as shown in block 514. Once the user has been notified, the system then performs a dynamic metadata ledger update, as shown in block 516. Finally, the system may disable subsequent resource transfer mode and resource transfer gateways for the particular resource transfer, ensuring that the resource transfer is not duplicated over a different mode/gateway pair, as indicated in block 518. The results of the entire process may be sent to the user or user device via a notification on a graphical user interface, as shown in block 522.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for resource transfer mode evaluation in distributed network using semi-dynamic tokenized graph node processing, the system comprising:

at least one non-transitory storage device; and at least one processor coupled to the at least one non-transitory storage device, wherein the at least one processor is configured to:

receive resource data from one or more resource transfer channels;

extract metadata from the resource data and determine one or more resource transfer processing requests;

generate a dynamic hash value for the one or more resource transfer processing requests;

tokenize the dynamic hash value to generate a semi-dynamic token, wherein the semi-dynamic token comprises a non-fungible token (NFT) comprising a static gateway or static channel metadata and a dynamic hash variable that is updated based on user input;

select a resource gateway and a resource mode for the one or more resource transfer processing requests;

generate a key value pair for the selected resource gateway and the resource mode;

tokenize the key value pair and store the tokenized key value pair on a distributed ledger; and flag one or more non-selected resource gateways and resource nodes.

2. The system of claim 1, wherein the at least one processor is further configured to: block one or more nodes associated with the flagged one or more non-selected resource gateways and resources nodes.

3. The system of claim 2, wherein the at least one processor is further configured to: transmit a notification to one or more user devices containing an override option for the block of the one or more nodes associated with the flagged one or more non-selected resource gateways and resources nodes.

4. The system of claim 3, wherein the at least one processor is further configured to: update metadata of the semi-dynamic token in response to receiving an affirmative response to the override option.

5. The system of claim 1, wherein the at least one processor is further configured to: disable all subsequent resource modes or resource gateways for the one or more resource transfer processing requests.

6. The system of claim 1, wherein selecting the resource gateway and the resource mode for the one or more resource transfer processing requests further comprises the use of a machine learning model to analyze the extracted metadata from the resource data to determine a resource transfer type.

7. The system of claim 1, wherein the at least one processor is further configured to: provide an option via a graphical user interface for a user to select the resource gateway and the resource mode.

8. A computer program product for resource transfer mode evaluation in distributed network using semi-dynamic tokenized graph node processing, the computer program product comprising a non-transitory computer-readable medium comprising code causing an apparatus to:

receive resource data from one or more resource transfer channels;

extract metadata from the resource data and determine one or more resource transfer processing requests;

generate a dynamic hash value for the one or more resource transfer processing requests;

tokenize the dynamic hash value to generate a semi-dynamic token, wherein the semi-dynamic token comprises a non-fungible token (NFT) comprising a static gateway or static channel metadata and a dynamic hash variable that is updated based on user input;

select a resource gateway and a resource mode for the one or more resource transfer processing requests;

generate a key value pair for the selected resource gateway and the resource mode;

tokenize the key value pair and store the tokenized key value pair on a distributed ledger; and flag one or more non-selected resource gateways and resource nodes.

9. The computer program product of claim 8, wherein the apparatus is further configured to: block one or more nodes associated with the flagged one or more non-selected resource gateways and resources nodes.

10. The computer program product of claim 9, wherein the apparatus is further configured to: transmit a notification to one or more user devices containing an override option for the block of the one or more nodes associated with the flagged one or more non-selected resource gateways and resources nodes.

11. The computer program product of claim 10, wherein the apparatus is further configured to: update metadata of the semi-dynamic token in response to receiving an affirmative response to the override option.

12. The computer program product of claim 8, wherein the apparatus is further configured to: disable all subsequent resource modes or resource gateways for the one or more resource transfer processing requests.

13. The computer program product of claim 8, wherein selecting the resource gateway and the resource mode for the one or more resource transfer processing requests further comprises the use of a machine learning model to analyze the extracted metadata from the resource data to determine a resource transfer type.

14. The computer program product of claim 8, wherein the apparatus is further configured to: provide an option via a graphical user interface for a user to select the resource gateway and the resource mode.

15. A method for resource transfer mode evaluation in distributed network using semi-dynamic tokenized graph node processing, the method comprising:

receiving resource data from one or more resource transfer channels;

extracting metadata from the resource data and determine one or more resource transfer processing requests;

generating a dynamic hash value for the one or more resource transfer processing requests;

tokenizing the dynamic hash value to generate a semi-dynamic token, wherein the semi-dynamic token comprises a non-fungible token (NFT) comprising a static gateway or static channel metadata and a dynamic hash variable that is updated based on user input;

selecting a resource gateway and a resource mode for the one or more resource transfer processing requests;

generating a key value pair for the selected resource gateway and the resource mode;

tokenizing the key value pair and store the tokenized key value pair on a distributed ledger; and flagging one or more non-selected resource gateways and resource nodes.

16. The method of claim 15, wherein the method further comprises: blocking one or more nodes associated with the flagged one or more non-selected resource gateways and resources nodes.

17. The method of claim 16, wherein the method further comprises: transmitting a notification to one or more user devices containing an override option for the block of the one or more nodes associated with the flagged one or more non-selected resource gateways and resources nodes.

18. The method of claim 17, wherein the method further comprises: updating metadata of the semi-dynamic token in response to receiving an affirmative response to the override option.

19. The method of claim 15, wherein the method further comprises: disabling all subsequent resource modes or resource gateways for the one or more resource transfer processing requests.

20. The method of claim 15, wherein selecting the resource gateway and the resource mode for the one or more resource transfer processing requests further comprises the use of a machine learning model to analyze the extracted metadata from the resource data to determine a resource transfer type.

* * * * *